United States Patent
Neilsen et al.

(10) Patent No.: US 11,561,927 B1
(45) Date of Patent: Jan. 24, 2023

(54) MIGRATING DATA OBJECTS FROM A DISTRIBUTED DATA STORE TO A DIFFERENT DATA STORE USING PORTABLE STORAGE DEVICES

(71) Applicant: Amazon Technologies, Inc., Seattle, WA (US)

(72) Inventors: Eric Neilsen, Lynnwood, WA (US); Jeffry Strunk, San Francisco, CA (US); Ho Ming Li, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 682 days.

(21) Appl. No.: 15/632,810

(22) Filed: Jun. 26, 2017

(51) Int. Cl.
*G06F 16/11* (2019.01)
*G06F 16/21* (2019.01)
*G06F 16/27* (2019.01)

(52) U.S. Cl.
CPC ......... *G06F 16/119* (2019.01); *G06F 16/214* (2019.01); *G06F 16/27* (2019.01)

(58) Field of Classification Search
CPC ....... G06F 16/119; G06F 16/214; G06F 16/27
USPC ........................................ 707/610, 639, 652
See application file for complete search history.

(56) References Cited

U.S. PATENT DOCUMENTS

| | | | | |
|---|---|---|---|---|
| 5,495,610 A * | 2/1996 | Shing | ................ | G06F 8/71 710/21 |
| 5,845,090 A * | 12/1998 | Collins, III | ............... | H04L 9/40 709/202 |
| 7,584,227 B2 * | 9/2009 | Gokhale | .............. | G06Q 10/087 707/999.204 |
| 2007/0162359 A1 * | 7/2007 | Gokhale | .............. | G06Q 10/087 705/28 |
| 2008/0005472 A1 * | 1/2008 | Khalidi | ............... | G06F 9/44584 711/115 |
| 2008/0294536 A1 * | 11/2008 | Taylor | ................... | G06Q 10/08 705/28 |
| 2009/0112843 A1 * | 4/2009 | Hsu | ......................... | G06F 16/93 707/999.005 |
| 2010/0306267 A1 * | 12/2010 | Zamkoff | ............. | G06F 11/1464 707/783 |
| 2012/0233228 A1 * | 9/2012 | Barton | .................. | G06F 3/0619 707/827 |

(Continued)

*Primary Examiner* — Phong H Nguyen
(74) *Attorney, Agent, or Firm* — Lee & Hayes, P.C.

(57) ABSTRACT

Technologies are disclosed for migrating large amounts of data objects, e.g., billions of data objects, from a distributed data store to another data store or computing device. A method includes generating an inventory of the data objects in the distributed data store and dividing the inventory into multiple listings of data objects. Each data object is identified in only one corresponding listing. Manifests are generated based upon the listings. Each manifest is assigned to a corresponding portable storage device of a plurality of portable storage devices, and the data objects and listings are transferred, based at least in part, upon the manifests to the plurality of portable storage devices. The inventory of the data objects and the plurality of portable storage devices are provided to an entity associated with the another data store or computing device. The data objects are transferred from the plurality of portable storage devices to the another data store or computing device using the inventory.

20 Claims, 6 Drawing Sheets

(56) References Cited

U.S. PATENT DOCUMENTS

| | | | | |
|---|---|---|---|---|
| 2015/0154418 A1* | 6/2015 | Redberg | ............. | G06F 21/6218 |
| | | | | 713/165 |
| 2015/0350316 A1* | 12/2015 | Calder | ................... | G06F 21/60 |
| | | | | 714/19 |
| 2016/0014225 A1* | 1/2016 | LeBlanc | ................ | H04L 67/04 |
| | | | | 709/206 |
| 2016/0253339 A1* | 9/2016 | Ambrose | ............. | G06F 3/0647 |
| | | | | 707/693 |
| 2016/0321275 A1* | 11/2016 | Yap | ...................... | G06F 9/4856 |
| 2017/0353516 A1* | 12/2017 | Gordon | ............. | H04N 21/8456 |
| 2018/0089224 A1* | 3/2018 | Muthuswamy | ......... | H04L 67/06 |
| 2018/0275881 A1* | 9/2018 | Ashraf | ................... | G06F 3/065 |
| 2018/0284999 A1* | 10/2018 | Aslam | .................. | G06F 3/0647 |

\* cited by examiner

MIGRATING DATA OBJECTS FROM A DISTRIBUTED DATA STORE TO A DIFFERENT DATA STORE USING PORTABLE STORAGE DEVICES

BACKGROUND

Distributed data stores may be implemented across multiple servers. Such distributed data stores may store user accounts made up of a large number of data objects. For example, a particular user account may include a billion or more data objects spread across multiple servers. Thus, migrating such user accounts from the data store to another entity, e.g., another data store, may take a large amount of time, e.g., months. Thus, the migration of such a large amount of data objects, in addition to being time consuming, generally incurs a large amount of computing costs associated with the computing resources involved in the migration.

Currently, in one situation, the large amount of data objects are sequentially transferred to portable storage devices, which are then utilized to transfer the data to its new location. However, the large amount of data objects can easily exceed the capacity of a single portable storage device. Thus, it is not uncommon to need to split the data across multiple (e.g., dozens) portable storage devices. Doing a simple key/value pair listing of every data object and then trying to split up the data objects into multiple portable storage devices is slow, sequential and makes it extremely difficult to deal with changing objects. For example, if the key/value pair listing generation and transferring of data objects onto a portable storage device is started, it is difficult to account for new data objects or data objects that have changed once they have been copied onto a portable storage device. For example, transferring inconsistent data objects can result in errors, which can result in degraded performance, as well as additional computing costs and time in correcting the inconsistencies.

The disclosure made herein is presented with respect to these and other considerations.

DETAILED DESCRIPTION

Figure 1A:
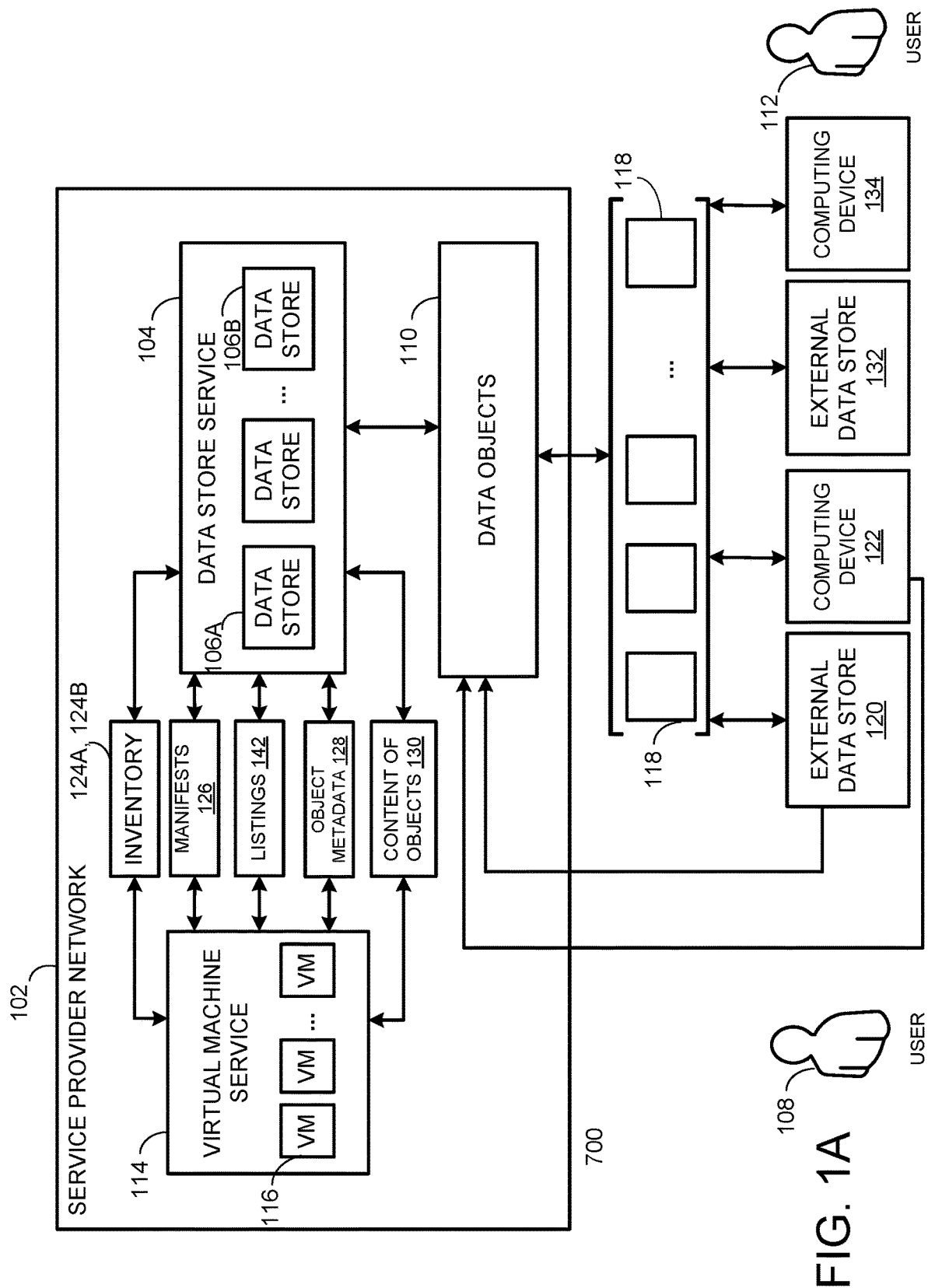
FIGS. 1A and 1B are network architecture diagrams illustrating aspects of one mechanism for storing data objects in a data store and migrating the data objects to another destination, according to configurations.

The following detailed description is directed to technologies for migration of large amounts of data objects from a data store to another destination, e.g., another data store or computing device. An inventory listing all of the data objects to be migrated is generated and divided into smaller manifests, where each data object is identified in only one manifest. Each manifest may be assigned to a portable storage device. In configurations, multiple manifests may be assigned to a single portable storage device. The data objects may then be copied according to the manifests onto the corresponding physical storage device. In configurations, the copying of the data objects on to multiple physical storage devices may be performed in parallel.

The physical storage devices may then be provided to an entity associated with the destination and utilized to upload the data objects to the new destination, e.g., another data store. Such techniques allow for a significant reduction in time in migrating large amounts of data objects. Such a reduction in time also leads to significant savings in use of processing and network computing resources in migrating the data objects from the distributed data store to the physical storage devices. Furthermore, due to the reduction in time in migrating the data objects from the data store to the portable storage devices, changed, deleted and/or new data objects may be more easily accounted for since there is less time for changes to data objects during the migration.

In particular, an inventory of data objects in a data store implemented by a data store service that are to be migrated to another entity, e.g., another data store, is generated. The data storage service can be provided by a service provider network. In configurations, the inventory is a listing of key/value pairs that identify the data objects. The inventory may then be divided into smaller manifests listing the data objects for transfer to portable storage devices. Thus, the manifests relate to a work list or work order for sending data objects to portable storage devices. Each data object is only identified within a single manifest. The manifests generally correspond to portable storage devices that are used in the migration of the data objects. In configurations, multiple manifests may correspond to a single portable storage device.

Once the manifests have been generated, the data objects may be copied or downloaded from the data store to a corresponding portable storage device based upon the manifest. Thus, the downloading of data objects to multiple portable storage devices may be performed in parallel. In configurations, the downloading may be performed asynchronously. Thus, the downloading of data objects to portable storage devices may be performed out of order. Additionally, in configurations, the data objects may be compressed prior to downloading of the data objects to the portable storage devices.

Once all of the data objects have been copied to the portable storage devices, the portable storage devices may then be sent to the entity associated with the destination. In configurations, as portable storage devices have received all of their data objects, such portable storage devices may be sent to the entity. The portable storage devices may then be used by the entity to upload the data objects to a new data store, a computing device, one or more servers, etc., associated with the entity. The new destination may be controlled or owned by the same user or entity that owns or controls the original data store from which the data objects were migrated, or may be controlled or owned by another user or entity.

In configurations, the data objects may be erased or eliminated from the original data store if desired. Additionally, the manifests may be generated based upon a total capacity of the portable storage devices or a total number of data objects to be loaded on the portable storage devices. In configurations, rules and/or logic may be utilized to assign data objects to manifests. Additional details regarding the various components and processes described briefly above for migrating large amount of data objects will be presented below with regard to FIGS. 1-5.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a network architecture diagram of a service provider network 102 that may provide multiple computing services and/or network services. For example, the service provider network 102 may include a data storage service 104 that may provide multiple data stores 106. In configurations, a first data store 106A may be owned or controlled by a first entity or user 108, where the user 108 may wish to store data objects 110. In configurations, an external data store 132 may be owned or controlled by a second entity or user 112. In configurations, one or both of the users 108, 112 are associated with an operator of the service provider network 102.

In configurations, the service provider network may also provide an on-demand computing service 114 that provides multiple instances of virtual machines 116. The virtual machines 116 may be configured to provide various computing services, e.g., virtual central processing units ("vCPUs"). In configurations, the data storage service 104 and the on-demand computing service 114 may be implemented via multiple servers (not illustrated). Thus, the data stores 106 may be implemented across multiple servers in a configuration that is often referred to as a distributed data store. Additional details regarding the configuration and operation of the service provider network 102 will be provided below with regard to FIGS. 3-5.

In configurations, portable storage devices 118 are provided. The portable storage devices 118 may be portable devices that include storage mediums in the form of, for example, a hard drive, solid state storage volumes, etc. The portable storage devices 118 may be owned and/or controlled by an operator of the service provider network 102. However, in configurations, one or more of the portable storage devices 118 may be owned by one of the users 108, 112 of the service provider network 102.

In configurations, the user 108 may provide or store data objects 110 in the first data store 106A. In configurations, the data objects 110 may be periodically stored in the first data store 106A from one or more virtual machines 116 or from an external data store 120 or from an external computing device 122 (e.g., one or more servers) of the user 108. In configurations, the data objects 110 may be provided by portable storage devices 118 to the data store 106A. In such configurations, the portable storage devices may receive the data objects from the external data store 120 or from the external computing device 122.

The user 108 may wish to move some or all of the data objects 110 in the data store 106A to the external data store 120. Alternately, the user may wish to migrate the data objects 110 to the computing device 122. Since the amount of data objects 110 in the first data store 106A may be very large, an inventory 124A (also referred to herein as inventory 124) of the data objects 110 in the first data store 106A may be generated by the data storage service 104 or by one or more virtual machines 116 in the on-demand computing service 114.

In configurations, the data objects 110 are stored in the data store 106A based upon key/value pairs. Thus, the inventory 124A may be a key/value pair listing that identifies the data objects 110 in the first data store to be migrated.

Once the inventory 124A has been generated, the inventory 124A may be divided into smaller groupings or bundles of data objects 110 identified in listings 142. Manifests 126 may be generated that list data objects 110 for transfer to portable storage devices 118 based upon the listings 142 of data objects 110. Thus, the manifests 126 relate to a work list or work order for sending data objects 110 from the data store 106A to portable storage devices 118. Each data object 110 is only listed in a single manifest 126. In configurations, the inventory 124A and the manifests 126 may be generated simultaneously.

In configurations, the manifests 126 are assigned to a corresponding portable storage device 118. In configurations, multiple manifests 126 may be assigned to a single portable storage device 118. Thus, when dividing the inventory 124A into smaller groupings of data objects 110 and generating the manifests 126 of data objects, the size of the groupings and the manifests 126 may be based upon a total size of data objects 110 that can be placed on a physical storage device 118. Alternately, the groupings of data objects 110 and the manifests 126 may be generated based upon a total number of data objects 110 to be loaded onto a portable storage device 118. As an illustrative example, the total size of data objects that may be included on each portable storage device may be four gigabytes ("GB"). Alternately, as another illustrative example, the total number of data objects 110 that may be included on a portable storage device may be 65,000 data objects.

In configurations, the listings 142 of data objects 110 and the manifests 126 may be generated based upon rules or logic, either instead of or in addition to the size of the portable storage devices 118. For example, it may be desirable for certain data objects 110 to be kept together. For example, it may be desirable to keep data objects 110 relating to a certain year together. Also, it may be desirable to keep data objects 110 relating to particular matter or entity together. Furthermore, data objects 110 may be grouped together based upon an age of the data objects 110. Additionally, data objects 110 may be kept together alphabetically.

Based at least in part on the manifests 126, the data objects 110 can be copied to a portable storage device 118 corresponding to a particular manifest 126. In configurations, one or more of the virtual machines 116 may copy the data objects 110 to the corresponding portable storage device 118. Thus, the one or more virtual machines 116 may copy data objects 110 from the data store 106A to corresponding portable storage devices 110 based upon manifests 126 in parallel. In configurations, the downloading may be performed asynchronously. Thus, the downloading of data objects 110 to portable storage devices may be performed out of order with respect to the portable storage devices 118, e.g., out of 5 portable storage devices 118, the third and fifth portable storage devices 118 may receive data objects 110 before the first, second and fourth portable storage devices 118 receive data objects 110.

In configurations, the one or more virtual machines 116 may compress the data objects 110 prior to moving the data objects 110 to the portable storage devices 118. The one or more virtual machines 116 may compress uncompressed data objects 110 and provide the compressed data objects 110 to the intermediate data store 106B. Based upon the manifests 126, the compressed data objects 110 may be copied from the intermediate store 106B to the portable storage devices 118 in bulk, thereby speeding up the process of transferring the data objects 110 to the portable storage devices 118. Additionally, in configurations, the portable storage devices 118 may include computing components to "pull" the data objects from either the data store 106A or the data store 106B.

In configurations, the data objects 110 may include metadata, e.g., last modified time, object tags, checksums, etc., that is stored with the data objects in the portable storage devices 118. However, in configurations, the portable storage devices 118 may not be able to preserve the metadata associated with the data objects 110. In such configurations, the one or more virtual machines 116 may create a file of object metadata 128 that contains the metadata for data objects 110 for each portable storage device 118 and then provide the object metadata 128 and the content 130 of data objects 110 to the intermediate data store 106B for downloading to the portable storage devices 118.

After all of the data objects 110 have been copied onto a particular portable storage device 118, in configurations the one or more virtual machines 116 can do a final scan of the data store 106A to see if any of the data objects 110 listed in the corresponding manifest 126 for the particular portable storage device 118 have been modified or deleted, or if any data objects 110 have been added. If so, the one or more virtual machines 116 can update the data objects 110 on the particular portable storage device 118 and update a listing 142 of the data objects 110 associated with the particular portable storage device 118. In particular, in order to determine if any of the data objects 110 have been modified or deleted, or if any data objects 110 have been added, a second inventory 124B may be generated. A delta between the first inventory 124A and the second inventory 124B may be determined by comparing the first inventory 124A and the second inventory 124B.

Once the data objects 110 have been provided to the portable storage devices 118, the inventory 124A (or 124B) may be sent to one of the users 108, 112 for which the data objects 110 are being migrated. The inventory 124A (or 124B) is the combination of all listings 142 of data objects and thus, references or identifies the specific listings 142 and portable storage devices 118 for the data objects 110. Each portable storage device 118 includes a corresponding copy of the listing 142 of data objects 110 included thereon. The portable storage devices 118 are also provided to the appropriate user 108, 112. As portable storage devices 118 complete receipt of their data objects, such portable storage devices 118 may be provided to the appropriate user 108, 112. The data objects 110 may then be moved from the portable storage devices 118 to e.g., one of the external data stores 120 or 132 or one of the computing devices 122 or 134.

In configurations, the data objects 110 may be moved from the portable storage devices 118 in parallel, e.g., multiple manifests 126 may be processed simultaneously to simultaneously migrate data objects 110 to corresponding portable storage devices 118. In configurations, the migration may be performed asynchronously. Thus, the migration of data objects 110 from portable storage devices may be performed out of order with respect to the portable storage devices 118, e.g., out of 5 portable storage devices 118, the third and fifth portable storage devices 118 may migrate data objects 110 before the first, second and fourth portable storage devices 118 migrate data objects 110 In configurations, the data objects 110 may be moved from the portable storage devices 118 to the external data store 120 or the external computing device 122 of the user 108. Alternately, the data objects 110 may be moved from the portable storage devices 118 to an external data store 132 or an external computing device 134 of the user 112.

Figure 1B:
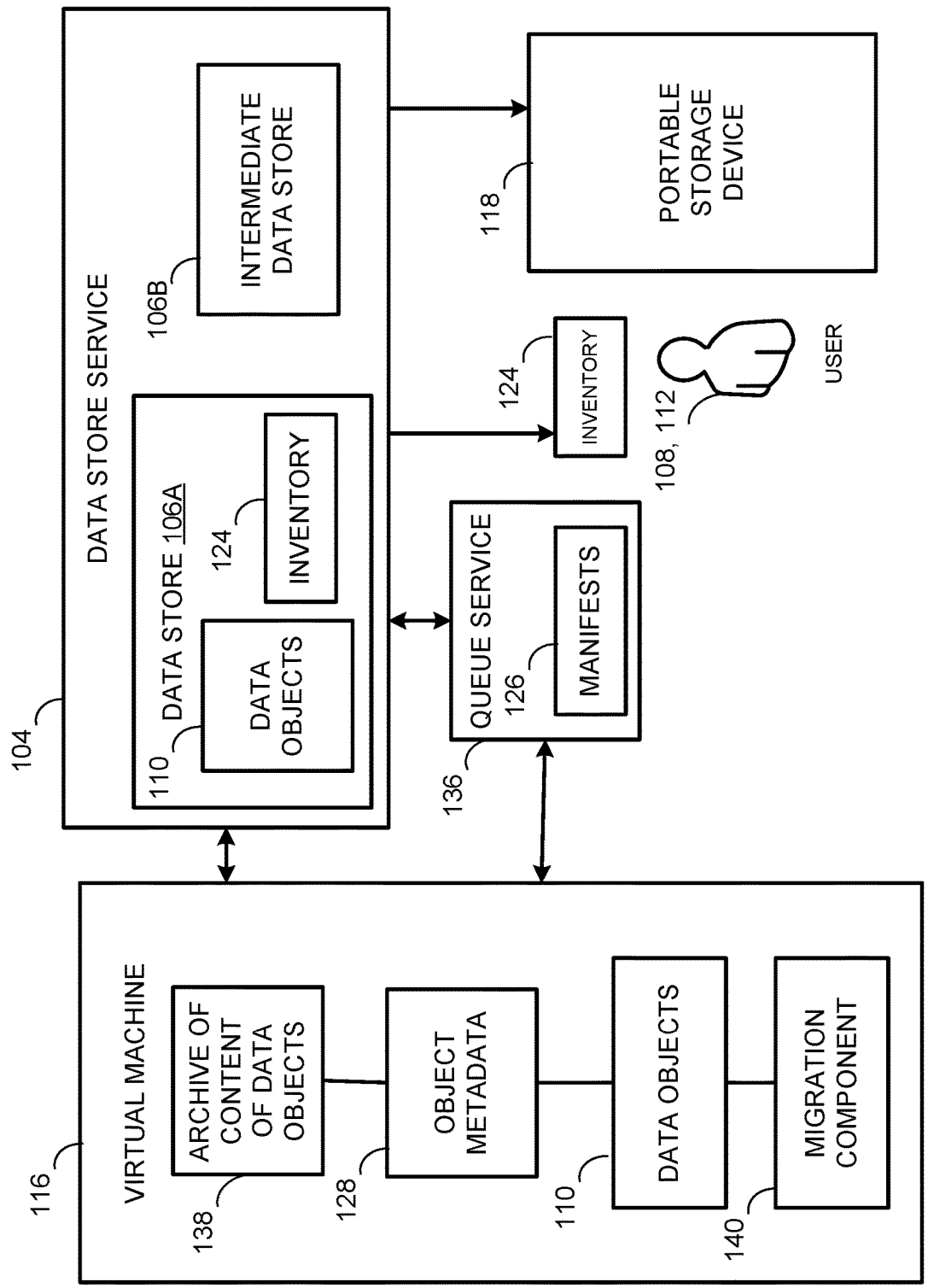

Referring to FIG. 1B, an example of an arrangement of components and a flow of migrating a large number of data objects 110 in accordance with techniques described herein may be described. In this example, the data store 106A may generate an inventory 124 of data objects 110 that are to be migrated to another location. As previously noted, in configurations, the inventory 124 may be generated by one or more virtual machines 116. The inventory 124 is further divided into smaller groups or listings 142 of data objects 110.

Based upon the listings 142, manifests 126 of data objects 110 may be generated by a virtual machine 116, wherein each manifest 126 of data objects is assigned to a portable storage device 118. The manifests 126 may then be stored in a queue service 136 provided by the service provider network 102. The manifests 126 may be retrieved from the queue service 136 and processed by a virtual machine 116. Based upon manifest 126, data objects 110 are downloaded from the data store 106A and grouped together. In configurations, the groups of data objects 110 may be compressed, if the data objects are not already compressed. The grouped data objects 110 may then be uploaded to the intermediate data store 106B.

In particular, in the example of FIG. 1B, a virtual machine 116 may poll the queue provided by the queue service 136 for a manifest 126 of data objects 110 to be processed. The virtual machine 116 may utilize a migration component 140 to retrieve data objects 110, based upon a manifest 126 that is being processed, from the data store 106A. Thus, since the on-demand computing service 114 provides multiple virtual machines 116, multiple manifests 126 of data objects 110 may be processed in parallel by multiple virtual machines 116. Multiple manifests 126 of data objects 110 may also be processed in parallel by multiple processes executing in parallel on the same virtual machine 116, or both by multiple virtual machines 116 and multiple processes executing in parallel on the same virtual machine 116. As data objects 110 of the manifest 126 are processed by the virtual machine 116, notifications may be sent by the data store 106A to the queue service 136 so that the queue service 136 can monitor when manifests 126 have been processed.

In configurations, if the portable storage devices 118 cannot preserve metadata, then the virtual machine 116 may generate a file of object metadata 128 for the data objects 110 of the manifest 126 that is being processed. The actual content 130 of the data objects 110 may be bundled together by the virtual machine 116 as a set or archive 138. In configurations, larger data objects 110 may be written and bundled into a multi-part archive 138.

In the example of FIG. 1B, the object metadata 128 and archive 138 of the body 130 of the data objects 110 may be provided to the intermediate data store 106B. As previously noted, prior to providing the object metadata 128 and archive 138 of the content 130 of the data objects 110, uncompressed content 130 of the data objects 110 in the archive 138 may be compressed by the virtual machine 116.

Once the object metadata 128 and the archive 138 are completed and provided to the intermediate data store 106B, the virtual machine 116 may then transfer the object metadata 128 and the corresponding archive 138 from the intermediate data store 106B to the portable storage device 118 that corresponds with the processed manifest 126. The described processing may be performed for all manifests 126 by one or more virtual machines 116. In configurations, the migration process may use a fleet of virtual machines 116 that are currently being unused by other entities or users, multiple non-virtualized servers, multiple threads or processes executing on the same server, etc. As previously noted, such processing of multiple manifests 126 may be performed in parallel by multiple virtual machines 116.

Once all manifests 126 have been processed and all portable storage devices 118 have received their corresponding data objects 110, metadata 128 and corresponding listing 142 of data objects 110, the portable storage devices 118 may then be provided to one of the users 108, 112 for transferring of the data objects 110 from the portable storage device 118 to the new data store 106B. The inventory 124 may also be forwarded by the data store 106A to the appropriate user 108 or 112. As previously noted, portable storage devices 118 may be provided to the appropriate user 108 or 112 as such portable storage devices 118 complete receipt of their data objects.

Thus, by dividing the inventory 124 of data objects 110 to be migrated, the migration may be performed in parallel on multiple portable storage devices 118, thereby saving time and costs associated with network resources, e.g., by reducing the processing time from as much as, e.g., multiple months to as little as, e.g., a week or even a few days. Additionally, efficiencies can be realized by bundling and compressing the data objects 110 prior to loading the data objects 110 onto the physical storage devices 118. Furthermore, the integrity of the migration process may be improved since the migration process can now be monitored based upon the manifests 126 that have been processed versus the number of data objects 110. Additionally, the techniques described herein provide for repeatable and reliable results. Splitting of the inventory 124 is consistent, e.g., if splitting of the inventory 124 needs to be repeated for some reason, the results generally are the same. Bundling or grouping of data objects 110 can be done multiple times (including retry on errors) and the results are generally the same. Furthermore, most of the processing and downloading of data objects 110 to portable storage devices 118, as well as delivery of portable storage devices 118 can be asynchronous.

Figure 2:
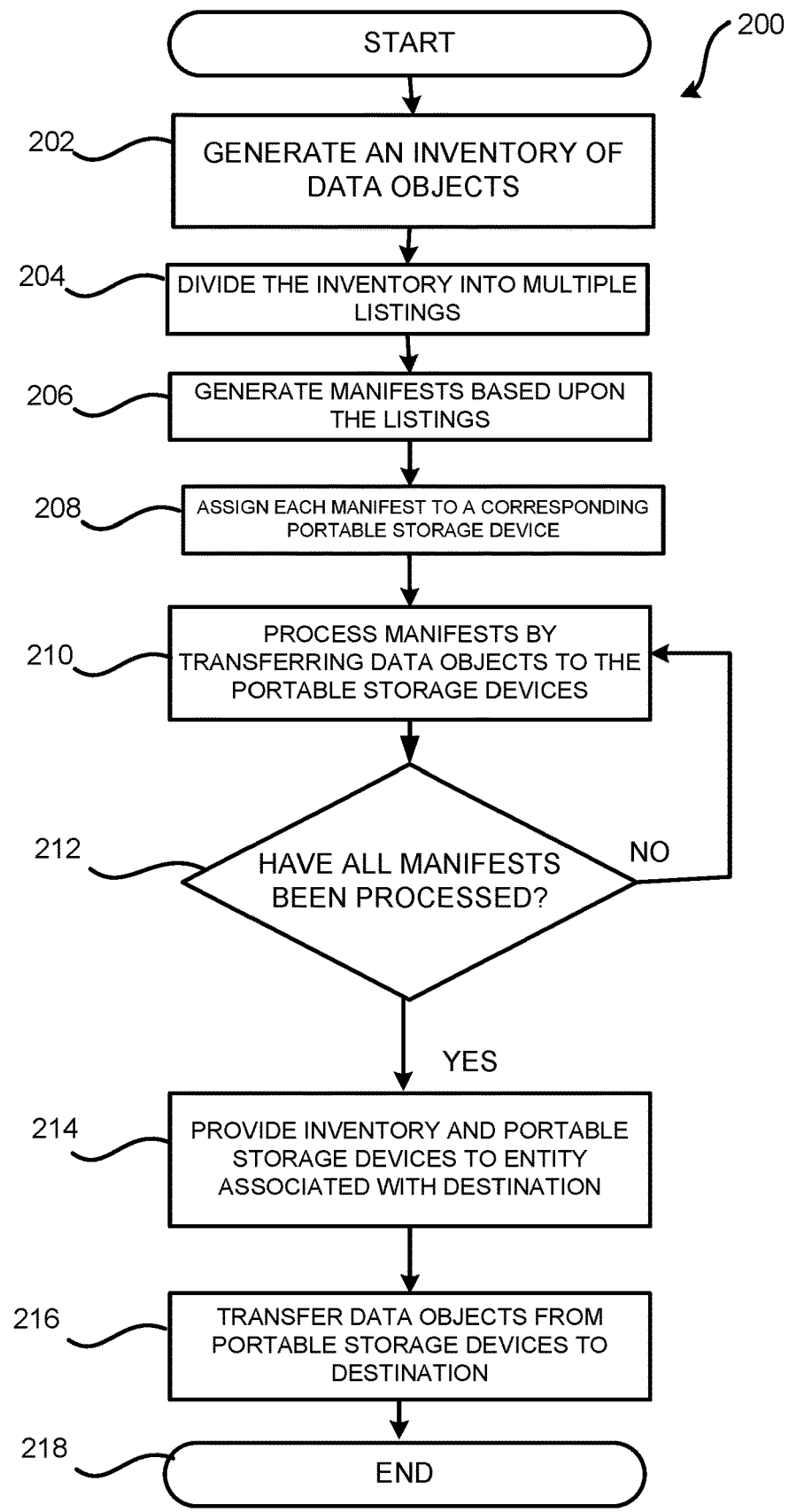
FIG. 2 is a flow diagram illustrating a routine that shows aspects of one mechanism for migrating data objects from a data store to another destination, according to one particular configuration.

FIG. 2 is a flow diagram illustrating a routine 200 that illustrates aspects of migrating data objects 110 from a data store, e.g., data store 106A, to another destination, e.g., data stores 120, 134, or computing devices 122, 134, as illustrated in FIGS. 1A and 1B. It should be appreciated that the logical operations described herein with respect to FIG. 2, and the other FIGs. can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than illustrated in the FIGS. and described herein. These operations can also be performed in parallel, or in a different order than those described herein. Some or all of these operations can also be performed by components other than those specifically identified.

The routine 200 begins at operation 202, where an inventory of the data objects, e.g., inventory 124, is generated. At operation 204, the inventory is divided into multiple listings of data objects, e.g., listings 142. Each data object is identified in only one listing. At operation 206, manifests, e.g., manifests 126, are generated based upon the listings 142. At operation 208, each manifest is assigned to a portable storage device, e.g., portable storage device 118.

From operation 208, the routine 200 proceeds to operation 210, where the manifests are processed by transferring data objects based upon the manifests to corresponding portable storage devices. In configurations, the data objects may be bundled together and compressed. From operation 210, the routine 200 proceeds to operation 212, where it is determined if all manifests have been processed. If not, the routine 200 proceeds to operation 210 to continue processing manifests.

If yes, at operation 214 the inventory and the portable storage devices are provided to an entity, e.g., user 108 or 112, that is associated with the destination of the migrating data objects. At operation 216, the data objects are transferred from the portable storage devices to the destination. The routine 200 ends at operation 218.

Figure 3:
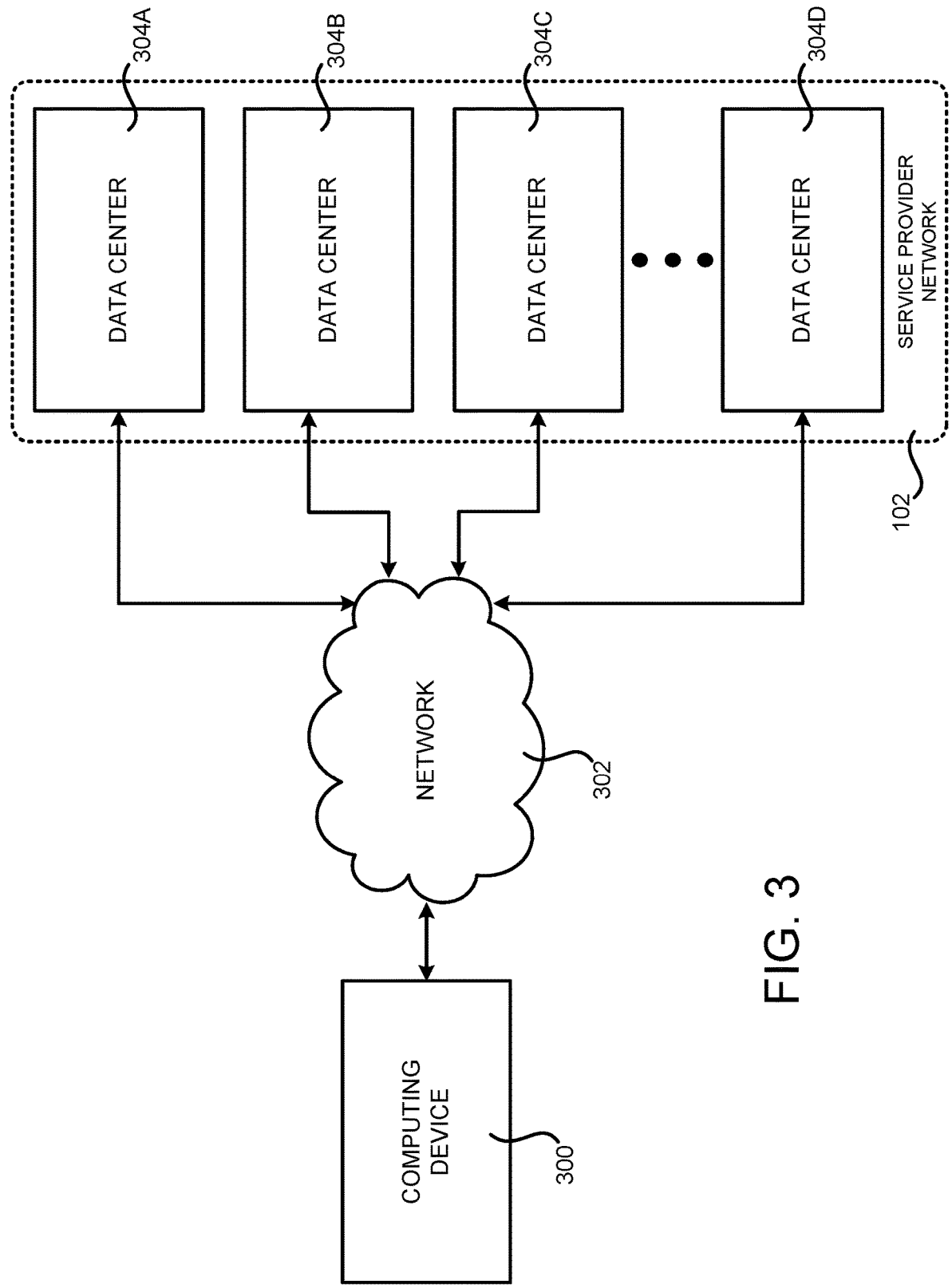
FIG. 3 is a system and network diagram that illustrates an illustrative operating environment that includes a service provider network that can be configured to implement aspects of the functionality described herein.

FIG. 3 is a system and network diagram that illustrates one illustrative operating environment for the configurations disclosed herein that includes a service provider network 102 that can be configured to execute the data storage service 104, the on-demand computing service 114 and the queue service 136 in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data processing resources, such as VM instances, data storage resources, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 304A-304D (which might be referred to herein singularly as "a data center 304" or collectively as "the data centers 304"). The data centers 304 are facilities utilized to house and operate computer systems and associated components. The data centers 304 typically include redundant and backup power, communications, cooling, and security systems. The data centers 304 can also be located in geographically disparate locations. One illustrative configuration for a data center 304 that can be utilized to implement the technologies disclosed herein will be described below with regard to FIG. 4.

The users of the service provider network 102 can access the computing resources provided by the service provider network 102 over a network 302, which can be a wide area communication network ("WAN"), such as the Internet, an intranet or an Internet service provider ("ISP") network or a combination of such networks. For example, and without limitation, a computing device 300 operated by a user of the service provider network 102, such as the user computing device 110, can be utilized to access the service provider network 102 by way of the network 302. It should be appreciated that a local-area network ("LAN"), the Internet, or any other networking topology known in the art that connects the data centers 304 to remote customers and other users can be utilized. It should also be appreciated that combinations of such networks can also be utilized.

Figure 4:
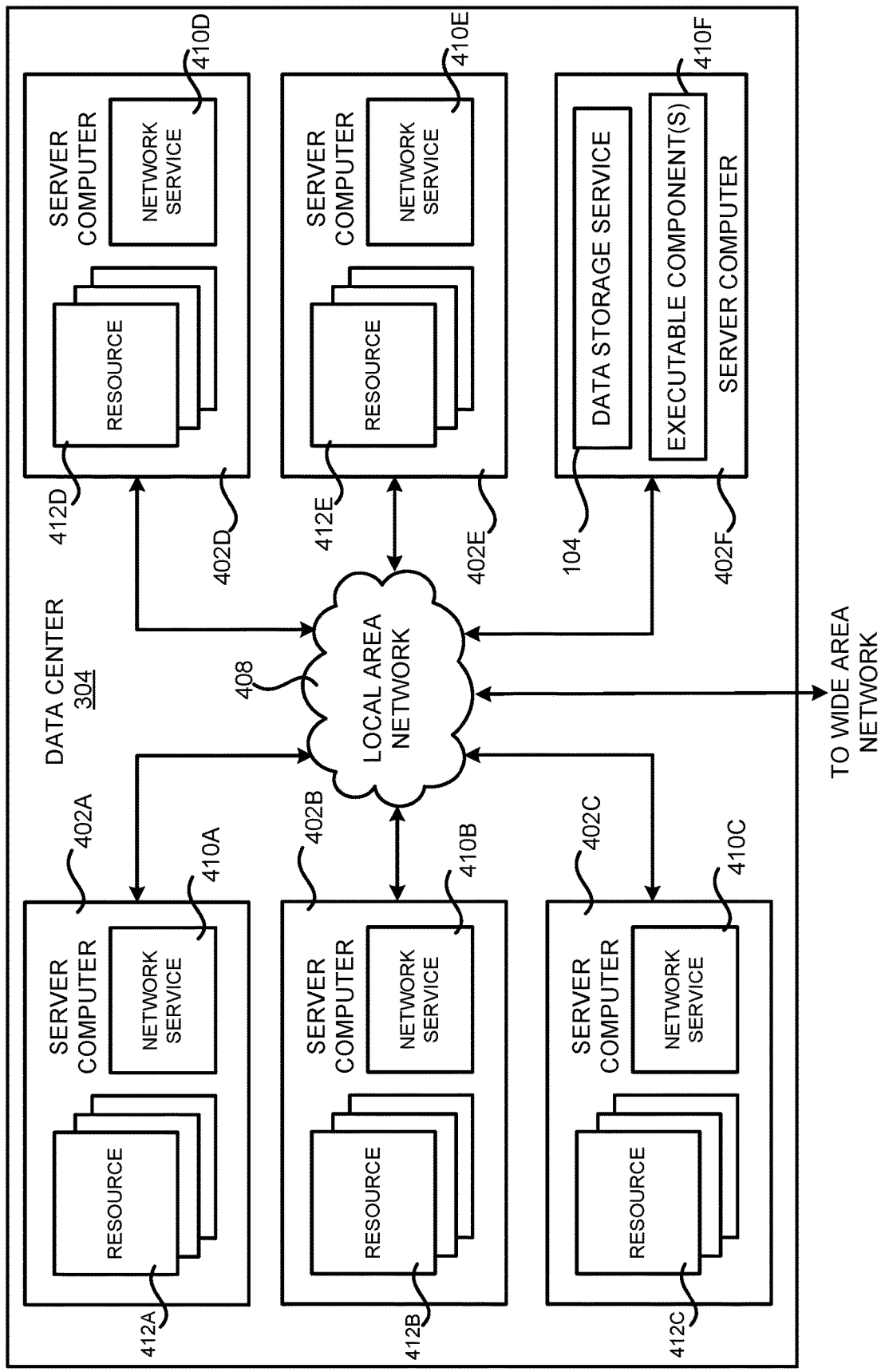
FIG. 4 is a computing system diagram illustrating a configuration for a data center that can be utilized to implement aspects of the technologies disclosed herein.

FIG. 4 is a computing system diagram that illustrates one configuration for a data center 304 that can be utilized to implement execute the data storage service 104, the on-demand computing service 114 and the queue service 136 and the other network services 410 disclosed herein. The example data center 404 illustrated in FIG. 4 includes several server computers 402A-402F (which might be referred to herein singularly as "a server computer 402" or in the plural as "the server computers 402") for providing the computing resources 412A-412E.

The server computers 402 can be standard tower, rack-mount, or blade server computers configured appropriately for providing the various computing resources described herein (illustrated in FIG. 4 as the computing resources 412A-412E). As mentioned above, the computing resources 412 provided by the service provider network 102 can be data processing resources such as virtual machine instances or hardware computing systems, data storage resources, database resources, networking resources, and others. Some of the servers 402 can also be configured to execute network services 410A-410E, respectively, capable of instantiating, providing and/or managing the computing resources 412A-412E, some of which are described in detail below with regard to FIG. 5.

The data center 304 illustrated in FIG. 4 also includes a server computer 402F that can execute some or all of the software components described above. For example, and without limitation, the server computer 402F can be configured to implement the data storage service 104, which has been described in detail above. The server computer 402F can also be configured to execute other components, e.g., on-demand computing service 114, and/or to store data for providing some or all of the functionality described herein. In this regard, it should be appreciated that components (e.g., executable components 410F) or different instances of the server computer 402F can execute on many other physical or virtual servers in the data centers 304 in various configurations.

In the example data center 304 illustrated in FIG. 4, an appropriate LAN 408 is also utilized to interconnect the server computers 402A-402F. The LAN 408 is also connected to the network 302 illustrated in FIG. 3. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 304A-304D, between each of the server computers 402A-402F in each data center 304, and, potentially, between computing resources 412 in each of the data centers 304. It should be appreciated that the configuration of the data center 304 described with reference to FIG. 4 is merely illustrative and that other implementations can be utilized.

Figure 5:
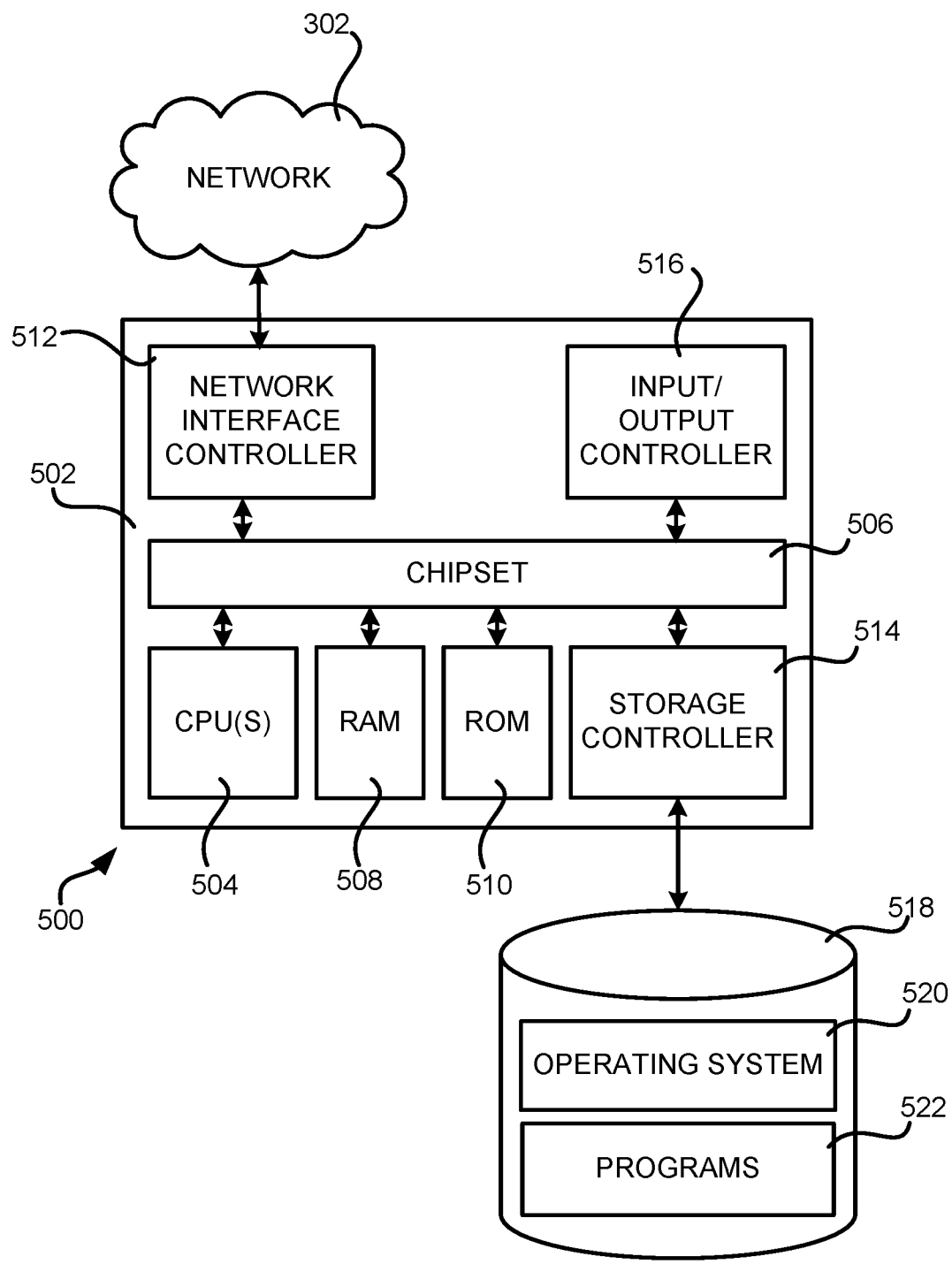
FIG. 5 is a computer architecture diagram illustrating an illustrative computer hardware architecture for implementing a computing device that can be utilized to implement aspects of the various technologies presented herein.

FIG. 5 illustrates an example computer architecture for a computer 500 capable of executing program components for implementing the functionality described above. The computer architecture illustrated in FIG. 5 illustrates a conventional server computer, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 302. The chipset 506 can include functionality for providing network connectivity through a NIC 512, such as a gigabit Ethernet adapter. The NIC 512 is capable of connecting the computer 500 to other computing devices over the network 302. It should be appreciated that multiple NICs 512 can be present in the computer 500, connecting the computer to other types of networks and remote computer systems.

The computer 500 can be connected to a mass storage device 518 that provides non-volatile storage for the computer. The mass storage device 518 can store an operating system 520, programs 522, and data, which have been described in greater detail herein. The mass storage device 518 can be connected to the computer 500 through a storage controller 514 connected to the chipset 506. The mass storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the mass storage device 518 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 518 is characterized as primary or secondary storage, and the like.

For example, the computer 500 can store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the mass storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 518 can store an operating system 520 utilized to control the operation of the computer 500. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 518 can store other system or application programs and data utilized by the computer 500.

In one configuration, the mass storage device 518 or other computer-readable storage media is encoded with computer-executable instructions which, when loaded into the computer 500, transform the computer from a general-purpose computing system into a special-purpose computer capable of implementing the configurations described herein. These computer-executable instructions transform the computer 500 by specifying how the CPUs 504 transition between states, as described above. According to one configuration, the computer 500 has access to computer-readable storage media storing computer-executable instructions which, when executed by the computer 500, perform the various processes described above with regard to FIGS. 1-2. The computer 500 can also include computer-readable storage media for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, a plotter, or other type of output device. It will be appreciated that the computer 500 might not include all of the components illustrated in FIG. 5, can include other components that are not explicitly illustrated in FIG. 5, or can utilize an architecture completely different than that illustrated in FIG. 5.

Based on the foregoing, it should be appreciated that technologies for migrating data objects from a data store to another destination, e.g., another data store or computing device, have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method of migrating electronic data objects from a distributed data store maintained by a service provider to a different data store, the method comprising:
    generating an inventory of the electronic data objects electronically stored in the distributed data store that is located at a first physical location, the inventory comprising key value pairs identifying a subset of the electronic data objects in the distributed data store to be moved;
    dividing the inventory into multiple listings of electronic data objects based at least in part on at least one of a capacity of individual portable storage devices of a plurality of portable storage devices, a total number of the electronic data objects, or a total size of the electronic data objects, wherein each electronic data object is identified in only one of the multiple listings;
    generating, by at least one of one or more virtual machines or a data storage service of the service provider, multiple manifests based at least in part upon the multiple listings and one or more rules associated with the electronic data objects;
    assigning each of the multiple manifests to a portable storage device of the plurality of portable storage devices that are each associated with the service provider, each portable storage device of the plurality of portable storage devices including memory that is used to temporarily store and electronically transfer the electronic data objects, and the plurality of portable storage devices being separate from the distributed data store and the different data store;
    electronically transferring the electronic data objects and the multiple listings in parallel, via a service provider network of the service provider and based at least in part upon the multiple manifests, from the distributed data store located at the first physical location to the plurality of portable storage devices located at the first physical location;
    causing the inventory of the electronic data objects and the plurality of portable storage devices to be transferred from the first physical location to a second physical location associated with the different data store, the second physical location being different than the first physical location; and
    electronically transferring in parallel, via the service provider network, the electronic data objects from the plurality of portable storage devices located at the second physical location to the different data store located at the second physical location based at least in part upon the inventory.

2. The computer-implemented method of claim 1, further comprising:
    after the electronic data objects and the multiple listings have been electronically transferred to the plurality of portable storage devices, determining if any electronic data objects of the electronic data objects have been modified, added, or deleted; and
    updating the multiple listings and the plurality of portable storage devices based at least in part upon determining that the any of the electronic data objects have been modified, added, or deleted.

3. The computer-implemented method of claim 2, wherein the inventory is a first inventory and determining if the any of the electronic data objects have been modified, added, or deleted comprises:
    generating a second inventory; and
    comparing the first inventory with the second inventory to provide a delta.

4. The computer-implemented method of claim 1, wherein electronically transferring the electronic data objects, based at least in part upon the multiple manifests, to the plurality of portable storage devices comprises electronically transferring the electronic data objects based, at least in part, upon the multiple manifests to at least some portable storage devices of the plurality of portable storage devices in parallel.

5. An apparatus, comprising:
    a processor; and
    a non-transitory computer-readable storage medium having instructions stored thereupon which, when executed by the processor, cause the apparatus to:
        generate an inventory of data objects that are electronically stored in a first data store that is located at a first physical location, the inventory comprising key value pairs identifying a subset of the data objects in the first data store to be moved;
        divide the inventory into multiple listings of data objects based at least in part on at least one of a capacity of individual portable storage devices of a plurality of portable storage devices, a total number of the data objects, or a total size of the data objects, wherein each data object is identified in only one listing of the multiple listings;
        generate, by at least one of one or more virtual machines or a data storage service of a service provider, multiple manifests based at least in part upon the multiple listings and one or more rules associated with the data objects;
        assign each of the multiple manifests to a portable storage device of the plurality of portable storage devices that are each associated with the service provider, each portable storage device of the plurality of portable storage devices including memory that is used to temporarily store and electronically transfer the data objects, and the plurality of portable storage devices being separate from the first data store and a second data store;
        electronically transfer, via a service provider network of the service provider and in parallel, the data objects and the multiple listings, based at least in part upon the multiple manifests, from the first data store located at the first physical location to the plurality of portable storage devices located at the first physical location;
        cause the inventory and the plurality of portable storage devices to be transferred from the first physical location to a second physical location associated with the second data store that is different than the first data store, the second physical location being different than the first physical location; and electronically transfer, via the service provider network and in parallel, the data objects from the plurality of portable storage devices located at the second physical location to the second data store located at the second physical location based at least in part upon the inventory.

6. The apparatus of claim 5, wherein the instructions, when executed by the processor, further cause the apparatus to compress uncompressed data objects prior to electronically transferring the data objects to the plurality of portable storage devices.

7. The apparatus of claim 5, wherein the inventory of the data objects is generated by at least one of the one or more virtual machines or the data storage service of the service provider.

8. The apparatus of claim 5, wherein the data objects stored in the plurality of portable storage devices include metadata.

9. The apparatus of claim 5, wherein the data objects include metadata, and wherein the instructions, when executed by the processor, further cause the apparatus to:
    remove the metadata from the data objects;
    store the metadata in a file; and
    transfer the file to a corresponding portable storage device that includes the data objects from which the metadata was removed.

10. The apparatus of claim 5, wherein the instructions, when executed by the processor, further cause the apparatus to:
    determine if any of the data objects have been modified, added, or deleted; and
    update the multiple listings and the plurality of portable storage devices based at least in part upon determining that the any of the data objects have been modified, added, or deleted.

11. The apparatus of claim 5, wherein the inventory is divided into the multiple listings based, at least in part, upon a total capacity of the plurality of portable storage devices.

12. The apparatus of claim 5, wherein the inventory is divided into the multiple listings based, at least in part, upon the one or more rules.

13. The apparatus of claim 12, wherein the one or more rules are configured to ensure that certain data objects are identified in a same listing, and wherein the one or more rules comprise at least one rule for dividing the data objects identified by the inventory into the multiple listings based at least in part upon an age of the data objects, based at least in part upon alphabetically, or another rule for dividing the data objects identified by the inventory into the multiple listings.

14. A non-transitory computer-readable storage medium having instructions stored thereupon which are executable by one or more processors and which, when executed, cause the one or more processors to:
    generate an inventory of data objects that are electronically stored in a first data store that is located at a first physical location, the inventory comprising key value pairs identifying a subset of the data objects in the first data store to be moved;
    divide the inventory into multiple listings of data objects based at least in part on at least one of a capacity of individual portable storage devices of a plurality of portable storage devices, a total number of the data objects, or a total size of the data objects, wherein each data object is identified in only one listing of the multiple listings;
    generate, by at least one of one or more virtual machines or a data storage service of a service provider, multiple manifests based at least in part upon the multiple listings and one or more rules associated with the data objects;
    assign each manifest of the multiple manifests to a portable storage device of the plurality of portable storage devices that are each associated with the service provider, each portable storage device of the plurality of portable storage devices including memory that is used to temporarily store and electronically transfer the data objects, and the plurality of portable storage devices being separate from the first data store and a second data store;
    electronically transfer, via a service provider network of the service provider and in parallel, the data objects and the multiple listings, based at least in part upon the multiple manifests, from the first data store located at the first physical location to the plurality of portable storage devices located at the first physical location;
    cause the inventory and the plurality of portable storage devices to be transferred from the first physical location to a second physical location associated with the second data store that is different than the first data store, the second physical location being different than the first physical location; and
    electronically transfer, via the service provider network and in parallel, the data objects from the plurality of portable storage devices located at the second physical location to the second data store located at the second physical location based at least in part upon the inventory.

15. The non-transitory computer-readable storage medium of claim 14, wherein the instructions, when executed by the one or more processors, further cause the one or more processors to compress uncompressed data objects prior to transferring the data objects to the plurality of portable storage devices.

16. The non-transitory computer-readable storage medium of claim 14, wherein the one or more rules are associated with one or more characteristics of the data objects, the one or more characteristics including at least one of a year associated with a data object, a matter associated with the data object, an entity associated with the data object, or an age associated with the data object.

17. The non-transitory computer-readable storage medium of claim 14, wherein the instructions, when executed by the one or more processors, further cause the one or more processors to:
    determine if any data objects of the data objects have been modified, added, or deleted; and
    update the multiple listings and the plurality of portable storage devices based at least in part upon determining that the any of the data objects have been modified, added, or deleted.

18. The non-transitory computer-readable storage medium of claim 14, wherein the data objects include metadata, and wherein the instructions, when executed by the one or more processors, further cause the one or more processors to:
    remove the metadata from the data objects;
    store the metadata in a file; and transfer the file to a corresponding portable storage device that includes the data objects from which the metadata was removed.

19. The non-transitory computer-readable storage medium of claim 14, wherein the inventory is divided into the multiple listings based, at least in part, upon a total capacity of the plurality of portable storage devices.

20. The non-transitory computer-readable storage medium of claim 14, wherein the inventory is divided into the multiple listings based, at least in part, upon the one or more rules.

\* \* \* \* \*